United States Patent
Yamazaki (10) Patent No.: US 7,499,096 B2
(45) Date of Patent: Mar. 3, 2009

(54) DEVICE AND METHOD FOR AUTOFOCUS ADJUSTMENT

(75) Inventor: Akihisa Yamazaki, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 916 days.

(21) Appl. No.: 10/278,893

(22) Filed: Oct. 24, 2002

(65) Prior Publication Data

US 2003/0081137 A1     May 1, 2003

(30) Foreign Application Priority Data

Oct. 26, 2001    (JP)    ............................ 2001-329498

(51) Int. Cl.
     *H04N 5/232*      (2006.01)
(52) U.S. Cl. ...................... 348/348; 348/349
(58) Field of Classification Search ................. 348/348, 348/349, 353, 354, 352
See application file for complete search history.

(56) References Cited

U.S. PATENT DOCUMENTS

| 5,668,597 | A | * | 9/1997 | Parulski et al. | ............... 348/350 |
| 6,023,056 | A | * | 2/2000 | Fiete et al. | ............... 250/201.7 |
| 6,704,054 | B1 | * | 3/2004 | Hashimoto | ............... 348/354 |

FOREIGN PATENT DOCUMENTS

| JP | 61-198880 | A | 9/1986 |
| JP | 62-69218 | A | 3/1987 |
| JP | 2-2292 | A | 1/1990 |
| JP | 5-210042 | | 8/1993 |
| JP | 5-210042 | A | 8/1993 |
| JP | 5-210043 | | 8/1993 |
| JP | 8-184890 | | 7/1996 |
| JP | 10-293245 | | 11/1998 |
| JP | 2001-141982 | | 5/2001 |
| JP | 2001-141983 | A | 5/2001 |
| JP | 2001-141984 | | 5/2001 |
| JP | 2001-221945 | A | 8/2001 |
| JP | 2001-255451 | A | 9/2001 |
| JP | 2001-290072 | A | 10/2001 |
| JP | 2001-350084 | | 12/2001 |

* cited by examiner

*Primary Examiner*—Tuan Ho
*Assistant Examiner*—Nicholas G Giles
(74) *Attorney, Agent, or Firm*—Sughrue Mion, PLLC (57) ABSTRACT

The autofocus adjustment device comprises a distance-measuring sensor and a contrast system AF, and is capable of attaining further speeding up and high accuracy. The autofocus adjustment device drives a focus lens according to the measurement result of a distance-measuring sensor and then performs focus adjustment according to a contrast system according to the image signal outputted from a solid-state image pickup element, and makes variable the search range and determination area of the contrast AF according to the measured distance from the object, brightness of the object, focal length and aperture, etc. of the lens. The distance-measuring sensor measures the distance from the object periodically before a release button is depressed and speeds up the focusing when the release button is depressed. The autofocus adjustment device also detects a change of the periodically acquired distance measurement output, determines the change of the object and when it is decided that the change of the object is large, performs focus adjustment according to the contrast system, and thereby speeds up AF processing and reduces electric power consumption.

4 Claims, 10 Drawing Sheets

DEVICE AND METHOD FOR AUTOFOCUS ADJUSTMENT

BACKGROUND OF THE INVENTION

1. Field of the Invention

The present invention relates to an autofocus (AF) adjustment device and a method thereof, and more particularly, to an autofocus control technology suitable for an electronic camera provided with an image pickup element.

2. Description of the Related Art

Conventionally, an electronic camera system is proposed which uses both the following AF systems: an AF of contrast system (contrast AF) that uses a high frequency component of an image signal obtained from an image pickup element such as a CCD; and an AF of active system (external light AF) that projects light onto an object from a phototransmitter and receives the reflection of light with a photoreceptor and measures a distance from the object using the principles of triangulation (Japanese Patent Application Publication Nos. 5-210042, 5-210043, 2001-141982, 2001-141983, etc.). These conventionally proposed systems are designed to select a focusing system from measurement results of the external light AF sensor, for example, by adopting the contrast AF when the distance from the object is small (Japanese Patent Application Publication No. 5-210043) or performing the external light AF for low brightness (Japanese Patent Application Publication No. 2001-141983).

Furthermore, another system is also proposed which moves the lens close to the focus position according to the result of the external light AF and then carries out the contrast AF (Japanese Patent Application Publication Nos. 8-184890 and 2001-141984).

However, Japanese Patent Application Publication Nos. 8-184890 and 2001-141984 neither refer to a search range of the contrast AF after the lens is moved close to the focus position according to the external light AF nor assume further autofocusing according to the result of the contrast AF. Moreover, these publications do not describe areas subject to the contrast AF.

In the case of a system that uses both the contrast AF and the external light AF, it is assumed that distance measurement results of the external light AF may vary due to influences of the object. Furthermore, distance-measuring points by the external light AF sensor may deviate from the center (AF target mark) of the angle of view of the image captured due to a parallax between the external light AF sensor and image pickup lens.

SUMMARY OF THE INVENTION

The present invention has been developed in view of the above-described circumstances, and it is an object of the present invention to provide au autofocus adjustment device and a method thereof capable of further improving an AF system combining a distance-measuring sensor and contrast AF (with higher speed and higher resolution).

In order to attain the above object, the present invention is directed to an autofocus adjustment device, comprising: a distance-measuring device which measures a distance from an object; an image pickup device which converts an optical image of the object taken in through an image pickup lens to an image signal; a focus adjustment device of a contrast system which adjusts a focus position of the image pickup lens using a high frequency component of the image signal outputted from the image pickup device; and a focus position range setting device which sets a range of the focus position for adjusting the focus position of the image pickup lens in the contrast system according to image pickup conditions, wherein the image pickup lens is driven according to a measurement result of the distance-measuring device, and then the focus adjustment device adjusts the focus position according to the image signal outputted from the image pickup device within the range of the focus position set by the focus position range setting device.

That is, the present invention is intended for an autofocus adjustment device that detects a focus position according to a contrast system using measurement results of the distance from an object by a distance-measuring device and attains a high-speed and high accuracy autofocus adjustment by making variable the range of the focus position to be adjusted by the contrast AF (that is, contrast AF search range) according to the situation as appropriate.

A mode of the present invention allows the focus position to be automatically changed according to the distance from the object measured by the distance-measuring device.

In another mode of the present invention, the autofocus adjustment device further comprises: a brightness determination device which determines brightness of the object, wherein the focus position range setting device changes the range of the focus position according to the brightness determined by the brightness detection device. For the brightness detection device, the image pickup device may be used or another photometric sensor may also be used instead of the image pickup device.

A further mode of the present invention is one which makes the range of the focus position variable according to the focal length or aperture of the image pickup lens. Since the focal length and aperture are elements that determine a depth of field, it is preferable to make variable the contrast AF search range according to the focal length and aperture.

Furthermore, there is also a mode in which a plurality of distance measured values is acquired by operating the distance-measuring device a plurality of times and the range of the focus position is automatically changed according to changes of the plurality of distance measured values. For example, if a change of the measured distance value is small, it is possible to speed up AF processing by reducing (narrowing) the search range accordingly.

According to another mode, as a result of focus adjustment according to the contrast system within the range set by the focus position range setting device, if the focus position cannot be found, the range of the focus position to be adjusted is automatically changed and focus adjustment is performed again according to the contrast system within the changed range.

If the focus position cannot be found by the first contrast AF, the search rage is expanded or shifted and a new search range is set and a contrast AF is performed again. Thus, automatically modifying the search range and performing a contrast AF again allows high accuracy focus adjustment.

The present invention is also directed to an autofocus adjustment device, comprising: a distance-measuring device which measures a distance from an object; an image pickup device which converts an optical image of the object taken in through an image pickup lens to an image signal; a focus adjustment device of a contrast system which adjusts a focus position of the image pickup lens using a high frequency component of the image signal outputted from the image pickup device; and an area setting device which sets an object area for adjusting the focus position of the image pickup lens in the contrast system according to image pickup conditions, wherein the image pickup lens is driven according to a measurement result of the distance-measuring device, and then the focus adjustment device adjusts the focus position according to the image signal outputted from the image pickup device within the object area set by the area setting device.

The present invention makes variable the area subject to a contrast AF with influences of a parallax due to a difference in the location between the distance-measuring device and image pickup device taken into consideration, and can thereby avoid erroneous focusing caused by the parallax.

There are various modes for the area setting device such as a mode in which the area is made variable according to the distance from the object measured by the distance-measuring device or a mode in which the area is made variable according to the focal length of the image pickup lens.

Furthermore, a mode is also preferable in which a multi-point distance-measuring device which performs distance measurements at a plurality of points of the object is used as the distance-measuring device and the area is automatically changed according to the result of multi-point distance-measurements. Such a mode allows focus adjustment with higher accuracy.

The present invention is also directed to an autofocus adjustment device, comprising: a distance-measuring device which measures a distance from an object; an image pickup device which converts an optical image of the object taken in through an image pickup lens to an image signal; a focus adjustment device of a contrast system which adjusts a focus position of the image pickup lens using a high frequency component of the image signal outputted from the image pickup device; and a control device which acquires distance-measuring output by periodically activating the distance-measuring device ahead of input of an image pickup start command and controls focus adjustment in the contrast system using the acquired distance-measuring output upon reception of the image pickup start command, wherein the image pickup lens is driven according to a measurement result of the distance-measuring device, and then the focus adjustment device adjusts the focus position according to the image signal outputted from the image pickup device.

Activating the distance-measuring device periodically ahead of input of an image pickup start command to measure the distance from the object speeds up the focusing when the image pickup start command is input.

The present invention is also directed to an autofocus adjustment device, comprising: a distance-measuring device which measures a distance from an object; an image pickup device which converts an optical image of the object taken in through an image pickup lens to an image signal; a focus adjustment device of a contrast system which adjusts a focus position of the image pickup lens using a high frequency component of the image signal outputted from the image pickup device; an object change detection device which acquires distance-measuring output by periodically activating the distance-measuring device and detects a change in the acquired distance-measuring output; and a control device which evaluates the change of the object according to the detected distance-measuring output and controls focus adjustment in the contrast system when the change of the object is larger than a threshold, wherein the image pickup lens is driven according to a measurement result of the distance-measuring device, and then the focus adjustment device adjusts the focus position according to the image signal outputted from the image pickup device.

When the change in the distance from the object measured by the distance-measuring device is small, this embodiment omits processing of contrast AF, and can thereby reduce electric power consumption and speed up the focusing.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

With reference now to the accompanied drawings, preferred embodiments of an autofocus adjustment device and a method thereof according to the present invention will be described in detail below.

Figure 1:
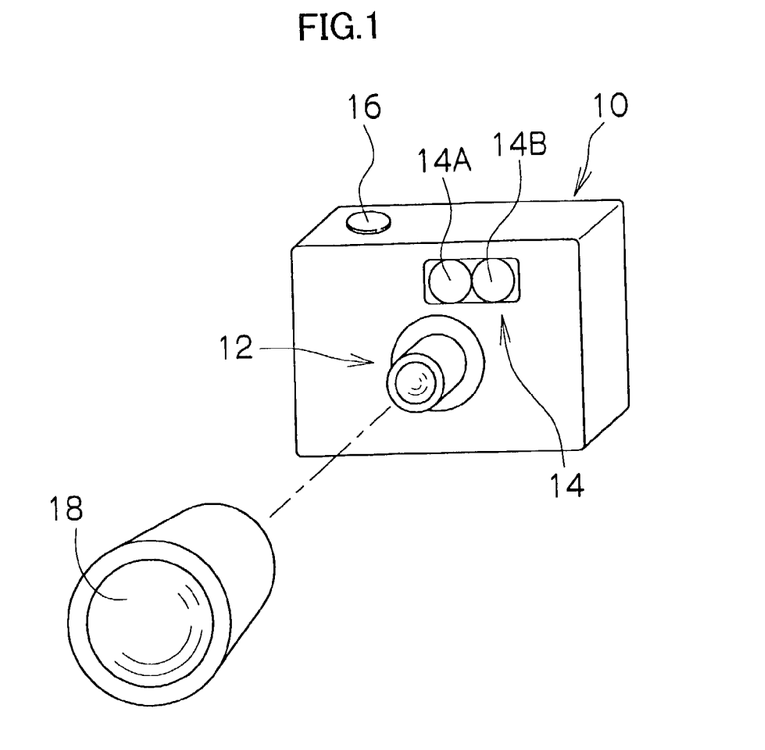
FIG. 1 is a front perspective view of a digital camera according to an embodiment of the present invention.

FIG. 1 is a front perspective view of a digital camera to which an embodiment of the present invention is applied. As shown in FIG. 1, a variable focal-length lens section 12 and a distance-measuring sensor 14 for measuring a distance from an object are provided on the front of the digital camera 10 and a release button 16 is provided on the top of the camera. It is also possible to mount a conversion lens 18 for converting the focal length of the lens ahead of the lens 12.

As the distance-measuring sensor 14, this embodiment uses a distance-measuring sensor according to an infrared active system having a phototransmitter 14A and photoreceptor 14B. However, the distance-measuring sensor for the present invention is not limited to the active system sensor which transmits light through an infrared LED, but various distance-measuring sensors such as an ultrasonic sensor and a passive system sensor can also be used.

Figure 2:
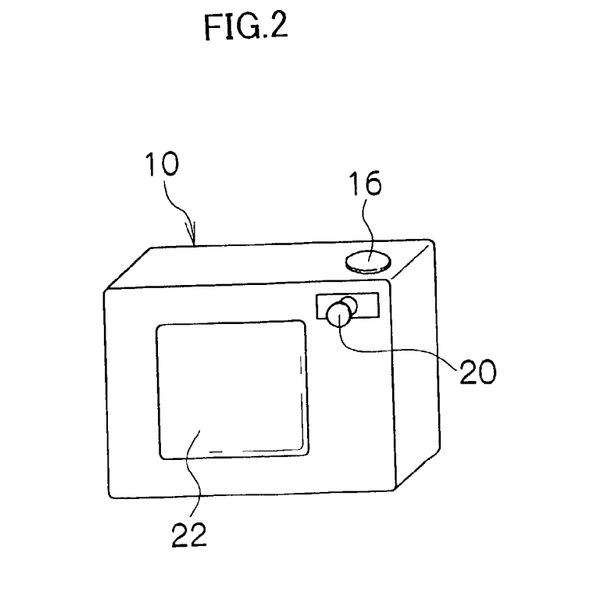
FIG. 2 is a back perspective view of the digital camera shown in FIG. 1.

FIG. 2 is a back perspective view of the digital camera 10. On the back of the digital camera 10, there are a zoom lever 20 to change magnification of images to be captured and an image display device 22 such as a liquid crystal display. The image display device 22 can not only be used as an electronic finder for checking the angle of view but also replay recorded images or display a menu screen or other information. The user operates the zoom lever 20, determines the angle of view such as a wide angle (WIDE) or telescopic (TELE) while checking a real-time image (live image) displayed on the image display device 22 and depresses the release button 16 to capture the image.

Figure 3:
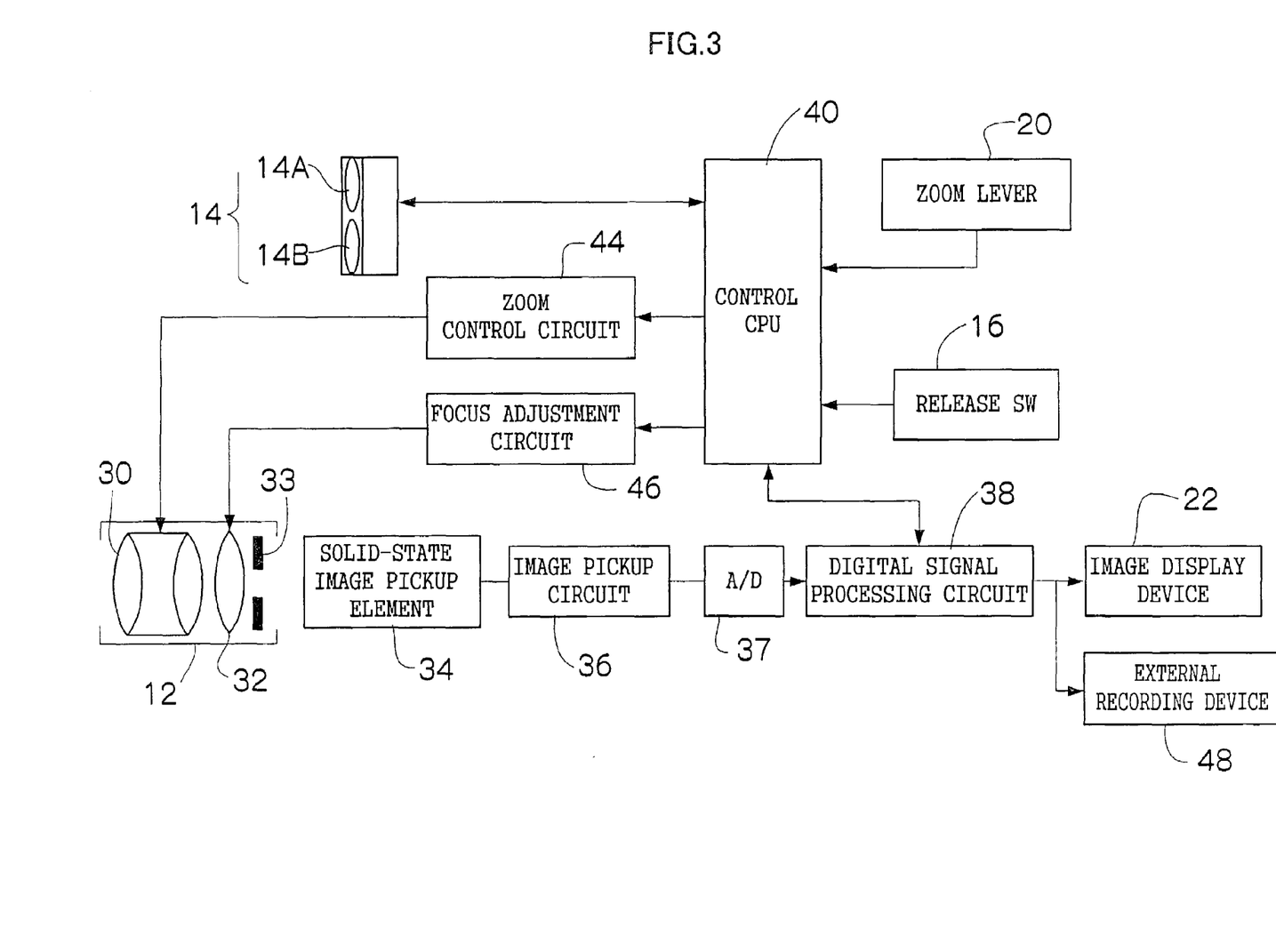
FIG. 3 is a block diagram showing an internal configuration of the digital camera in the embodiment.

FIG. 3 is a block diagram showing an internal configuration of the digital camera 10. The lens section 12 includes a variator lens 30 for magnification adjustment, a focus lens 32 for focus adjustment and an aperture 33. An optical image of the object formed on the photoreception surface of a solid-state image pickup element 34 through the lens section 12 is photoelectrically converted by the solid-state image pickup element 34 and outputted as an image signal. As the solid-state image pickup element 34, an image pickup device of various systems such as CCD and CMOS can be used.

The image signal outputted from the solid-state image pickup element 34 is sent to an image pickup circuit 36. The image pickup circuit 36 includes various signal processing circuits such as a sample and hold circuit, a color separation circuit and a gain adjustment circuit. The image signal outputted from the solid-state image pickup element 34 is subjected to correlative double sampling (CDS) processing and color separation processing for separating the signal into R, G and B color signals and adjustment of signal levels of the respective signals at the image pickup circuit 36.

The signal outputted from the image pickup circuit 36 is converted to a digital signal by an A/D converter 37 and then sent to a digital signal processing circuit 38. The digital signal processing circuit 38 is an image processing device including a brightness/color difference signal generation circuit, a brightness determination circuit, a gamma correction circuit, a sharpness correction circuit, a white balance correction circuit, a zooming circuit, etc. and processes the image signal according to a command from a control CPU 40. The control CPU 40 is a control section that exercises control over this camera system. According to signals received from the zoom lever 20, release button 16 and other operation sections, the control CPU 40 controls operations of the corresponding circuits.

The image signal is converted to a display signal by the digital signal processing circuit 38 and is outputted to an image display device 22, and the content of the image is thereby displayed on a screen of the image display device 22. Image data to be displayed is periodically rewritten with the image signal outputted from the solid-state image pickup element 34 and the image signal generated from the image data is supplied to the image display device 22, and the image captured by the solid-state image pickup element 34 is thereby displayed on the image display device 22 as a moving image (live image) in real time.

When the user operates the zoom lever 20, a signal indicating the operation direction and amount of operation (zoom operation signal) is inputted to the control CPU 40. The control CPU 40 controls a zoom control circuit 44 according to the zoom operation signal from the zoom lever 20. The zoom control circuit 44 controls a zoom drive motor (not shown) according to a command from the control CPU 40 and moves the variator lens 30 in the TELE or WIDE direction. The position of the variator lens 30 (zoom position) is determined by a position sensor (not shown) and the determined signal is inputted to the control CPU 40.

When the release button 16 is depressed after the angle of view is checked, a signal instructing the start of image pickup (release ON) is issued. The control CPU 40 detects the release ON signal and executes an image pickup operation for recording. That is, the control CPU 40 performs AE/AF processing, controls the diameter of the aperture 33 and an electronic shutter (unnecessary charge discharging function) of the solid-state image pickup element 34 according to the AE operation and thereby controls exposure and at the same time outputs a command signal to a focus adjustment circuit 46 according to the result of the contrast AF operation using the detected signal from the distance-measuring sensor 14 and image signal, and controls operation of a focus drive motor (not shown) to move the focus lens 32 to a focus position. The AF control will be described later in more detail. The control CPU 40 keeps track of the distance from the object through the detected signal from the distance-measuring sensor 14 and uses the distance-measuring information to set contrast AF conditions (determination area and search range). The position of the focus lens 32 (focus position) is determined by a position sensor (not shown) and the determined signal is inputted to the control CPU 40.

Thus, the control CPU 40 controls the exposure and focus of the image captured of the object and performs exposure and reading. The image data captured is subjected to necessary processing by the digital signal processing circuit 38 and then recorded in an external recording device 48. As the external recording device 48, it is possible to use various removal media such as a memory card, magnetic disk, optical disk, and magneto-optical disk. A signal processing device and interface according to the medium used are applied. It is also possible to adopt a configuration that allows a plurality of media to be mounted irrespective of recording media of different kinds or the same kind. The media are not limited to removal media and it is also possible to adopt a mode in which image data is saved in a recording medium (internal memory) built in the digital camera 10.

Figure 4:
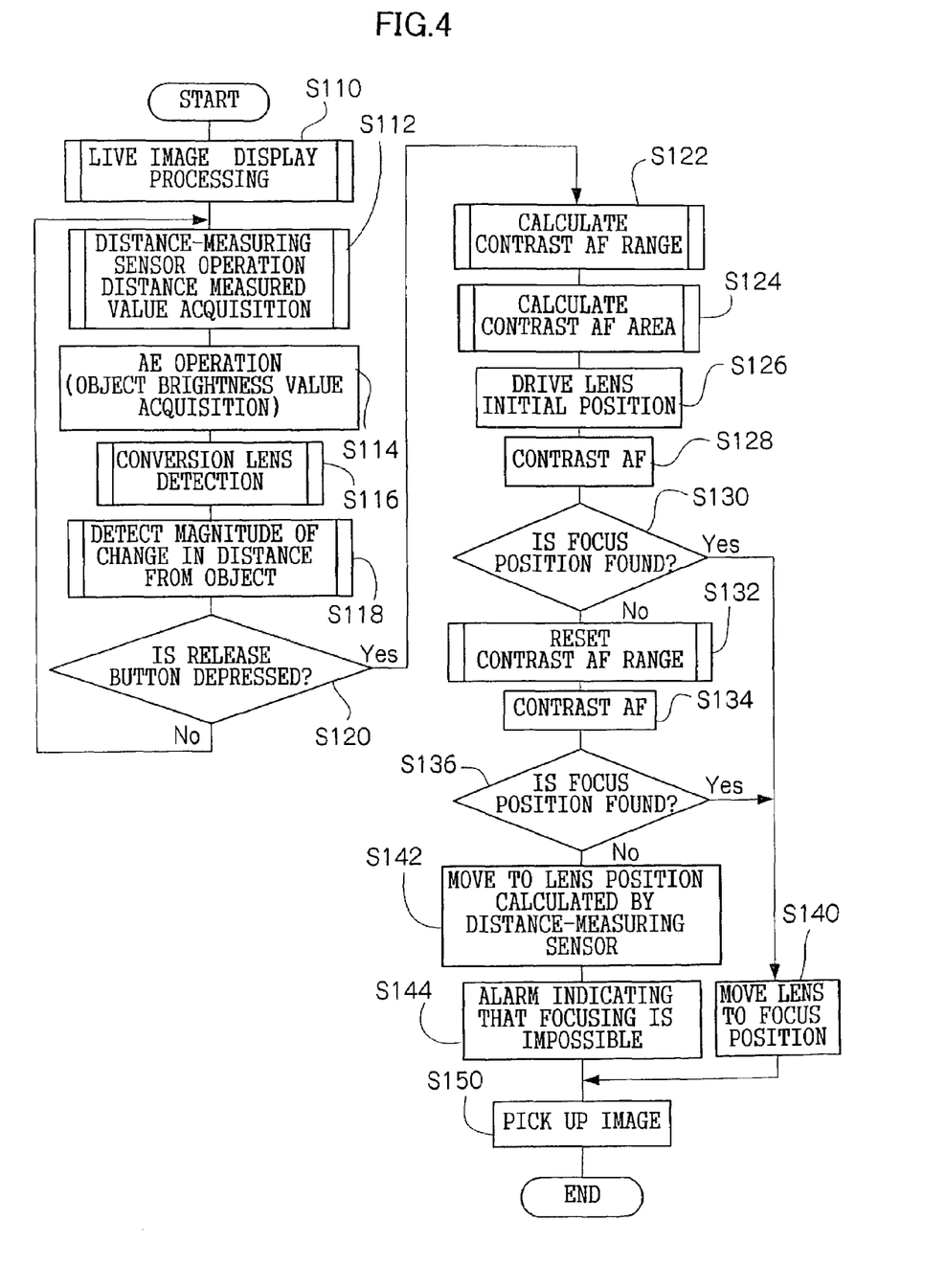
FIG. 4 is a flow chart showing an AF operation flow of the digital camera in the embodiment.

Then, an operation of the digital camera in the above described configuration will be explained. FIG. 4 is a flow chart showing an AF operation flow of the digital camera 10 in this embodiment. FIG. 4 shows a procedure after power is turned ON, a live image is displayed on the image display device 22 until the release button 16 is depressed to execute image pickup.

That is, when the power to the camera is turned ON, necessary settings are made for the image pickup circuit 36 and digital signal processing circuit 38 and live images (movie images) of signals from the solid-state image pickup element 34 are displayed consecutively on the image display device 22 (step S110). While live images are displayed, the distance-measuring sensor 14 is activated periodically to acquire distance measured values (step S112) and automatic exposure control (AE) is performed periodically to determine the brightness of the object and adjust exposure (step S114). Furthermore, a process is performed to detect whether the conversion lens 18 is mounted or not (step S116). When the tele-conversion lens or wide-conversion lens is mounted on the lens section 12, part of the conversion lens 18 enters into a determination light path of the distance-measuring sensor 14, which may prevent a correct measurement of the distance from the object, and therefore the conversion lens 18 is subjected to the detection process in step S116.

Then, a process of monitoring changes in periodically acquired distance measured values (distance from the object) is carried out (step S118). This makes it possible to decide whether the distance from the object has changed drastically for some reasons, for example, in the case where the object is a moving object or the user is manipulating the camera to change the angle of view or the distance from the object is stable to allow almost the same distance measured value to be obtained.

More specifically, distance measured values acquired at certain intervals in step S112 are recorded in a buffer and the distance measurement results are used. Here, an example of recording distance measured values for three measurements is shown. Suppose the currently acquired distance measured value is D(t) and the distance measured values corresponding to the last and last but one acquisition are D(t−1) and D(t−2), respectively. Then, a maximum value Dmax and minimum value Dmin of these three distance measured values are calculated. When the object is not moving and the user does not change the angle of view of the image captured, D(t) has little time variation and the value (Dmax−Dmin) is thus small. The contrast AF range which will be described later is made variable according to the value (Dmax−Dmin).

Then, whether the release button 16 is depressed or not is detected (step S120) and if the release button 16 is not depressed, the process moves back to step S112 and repeats the above steps (steps S112 to S120) at predetermined intervals. If it is detected in step S120 that the release button 16 is depressed, the process moves on to step S122. In step S122, the range for carrying out focus adjustment according to a contrast system (contrast AF range) is determined according to the periodically acquired distance measured values, brightness of the object and information of the focal length of the camera.

That is, when the object has an uneven surface and is located in a short distance, there are frequent variations in distance measured values, brightness may be too high or too low, which makes measured distance values unstable or deteriorates the measuring accuracy of the distance-measuring sensor, making it necessary for contrast AF to cover more ranges. Furthermore, when there are large variations in the periodically acquired distance measured values, the range of the focus position subject to the contrast AF is widened accordingly. Since the depth of focus varies depending on the focal length and aperture of the camera, the range is reduced on the WIDE side and widened on the TELE side.

Here, the contrast AF range will be explained. Generally, the condition under which an object is in sharp focus (within an allowable circle of confusion) when the focus lens is placed at an infinite distance is expressed by the following Expression (1):

$$L = f^2/(\delta \times F), \quad (1)$$

where L is over focal length, $\delta$ is allowable circle of confusion, F is aperture, and f is focal length.

Since the diameter of the circle of confusion in Expression (1) is a fixed value, if the focal length is long and the aperture (f-number) is small, the over focal length increases (the depth of field decreases). When the object side is enough long compared to the image surface side, the following Expression (2) can be used approximately:

$$L \propto f^2/(\delta \times F), \quad (2)$$

where L is distance from object, $\delta$ is amount of movement of image surface, F is aperture, and f is focal length.

Figure 5:
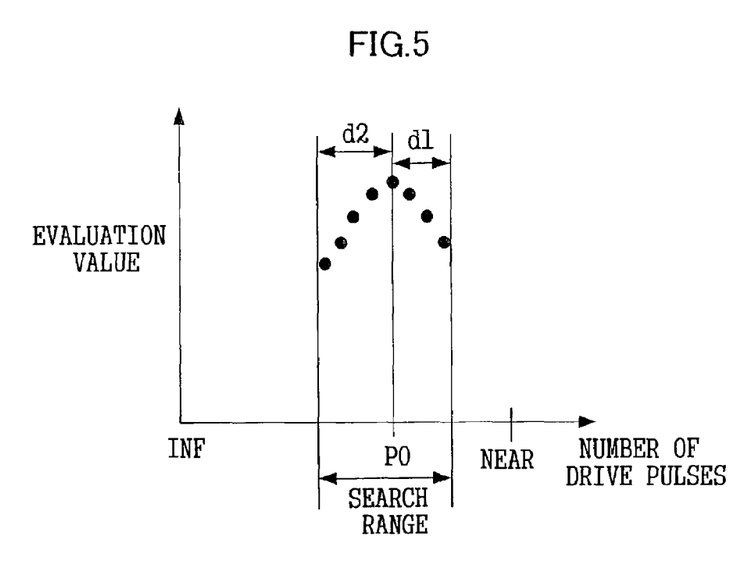
FIG. 5 illustrates an example of a search range of a contrast AF.

FIG. 5 illustrates an example of a search range of a contrast AF. When the distance from object determined by the distance-measuring sensor 14 is L, a theoretical focus position P0 of the focus lens is determined by a focus curve determined by properties of the lens. However, sharp focus may not necessarily be obtained at P0 due to an error of the distance-measuring sensor, and temperature characteristic and mechanical error of the focus lens.

Therefore, this embodiment searches only this error range portion by the contrast AF. Suppose the search range is close to P0, that is, within a radius of d1 from P0 toward the near side and within a radius of d2 from P0 toward the far side, then d1 and d2 are expressed by Expressions (3) and (4), respectively:

$$d1 = \left(\frac{1}{L1} + \alpha(t, B)\right)\frac{f^2}{F} + \beta(t) \quad (3)$$

$$d2 = \left(\frac{1}{L2} + \alpha(t, B)\right)\frac{f^2}{F} + \beta(t) \quad (4)$$

L1 and L2 in Expressions (3) and (4) are determined as follows. Assuming that the output distance of the distance-measuring sensor 14 is L, if the object is in a short distance, there may be many influences of objects with uneven surfaces. Suppose a "distance variation" of the uneven object is n. Furthermore, the case where the aforementioned result of periodical distance measurements shows that the object is not stable is also considered as a distance variation.

Therefore, L1 and L2 are obtained from the following Expressions (5) and (6), respectively:

$$\frac{1}{L1} = \frac{1}{L} - \frac{1}{L+n+(D\max - D\min)} \quad (5)$$

$$\frac{1}{L2} = \frac{1}{L-n-(D\max - D\min)} - \frac{1}{L} \quad (6)$$

As shown in Expressions (5) and (6), if the object does not change, (Dmax−Dmin)=0; and 1/L1 and 1/L2 approximate to 0, if L is sufficiently large compared to n. That is, when the object is distant and the distance from the object is stable, the search range becomes smaller.

Figure 6:
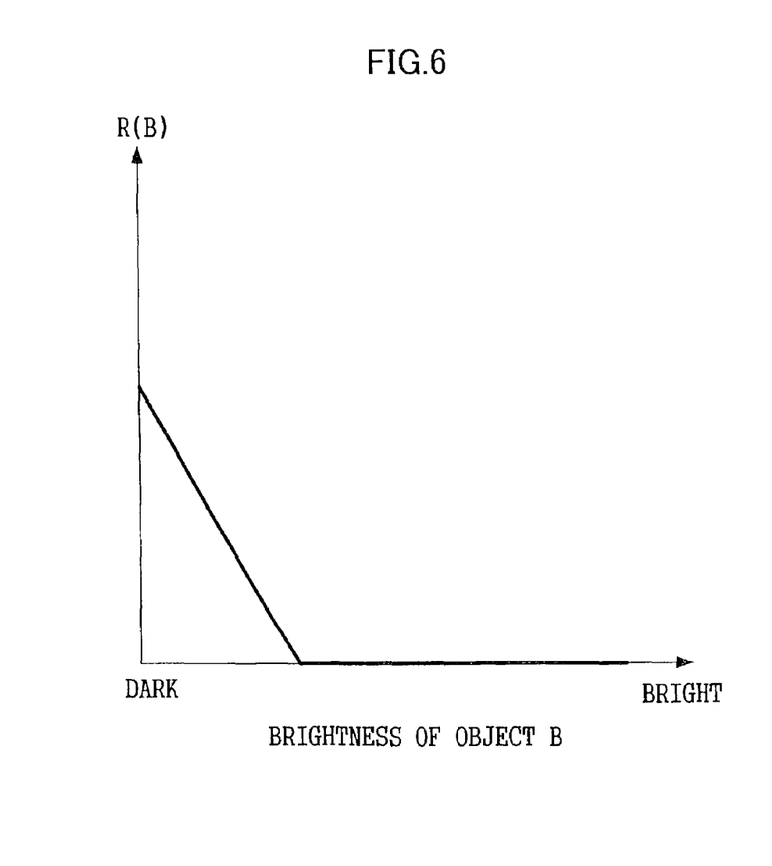
FIG. 6 is a graph showing a distance-measuring error R(B) of a distance-measuring sensor with respect to brightness of an object.

Furthermore, $\alpha$ in Expressions (3) and (4) is a measurement error of the distance-measuring sensor 14 and assuming here that $\alpha$ is a function that varies according to an ambient temperature t and brightness B of the object, $\alpha(t, B)$ is given by the following Expression (7):

$$\alpha(t,B) = R(B) + k \times |t_0 - t|, \quad (7)$$

where R(B) is a measurement error with respect to the brightness and takes a value as shown in the graph in FIG. 6, $t_0$ is a reference temperature, and k is a constant.

Therefore, when the brightness of the object is low, the measurement error is large, while when a deviation from the reference temperature is large, the measurement error increases. Moreover, when the measurement error $\alpha$ is large, the range of contrast AF is also wide according to Expressions (3) and (4).

$\beta$ in Expressions (3) and (4) is an error on the image surface side of the lens and varies according to the temperature characteristic of the lens and is determined by a mechanical error q of the lens (endurance, repetitive errors, etc.). A lens error changes with repeated use and therefore if it is assumed to be a fixed value, $\beta(t)$ is expressed by the following Expression (8) as a function of a deviation from the reference temperature $t_0$:

$$\beta(t) = q + m \times |t_0 - t|, \quad (8)$$

where m is a constant.

According to the above-described mathematical Expressions (3) to (8), the contrast AF range is calculated in step S122 in FIG. 4. Then, the process moves on to step S124 shown in FIG. 4 and the area where the contrast AF is performed is determined.

Figure 7:
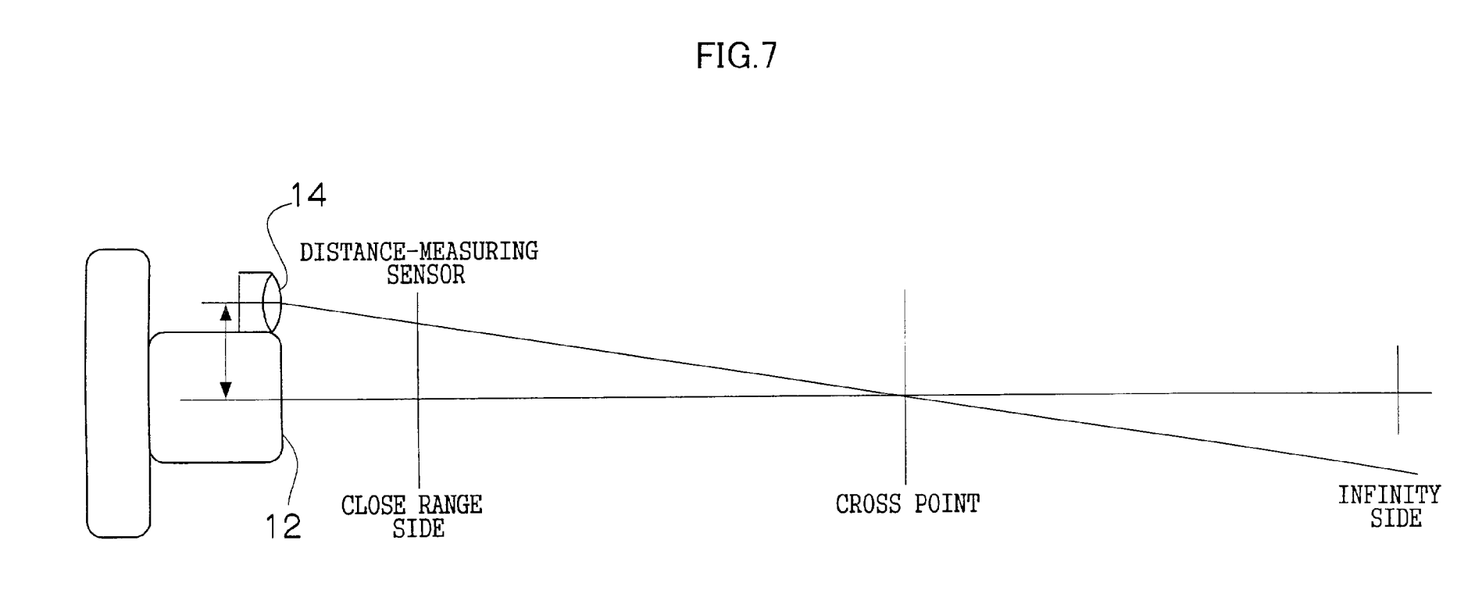
FIG. 7 illustrates a parallax between an image pickup lens and the distance-measuring sensor.
Figure 8:
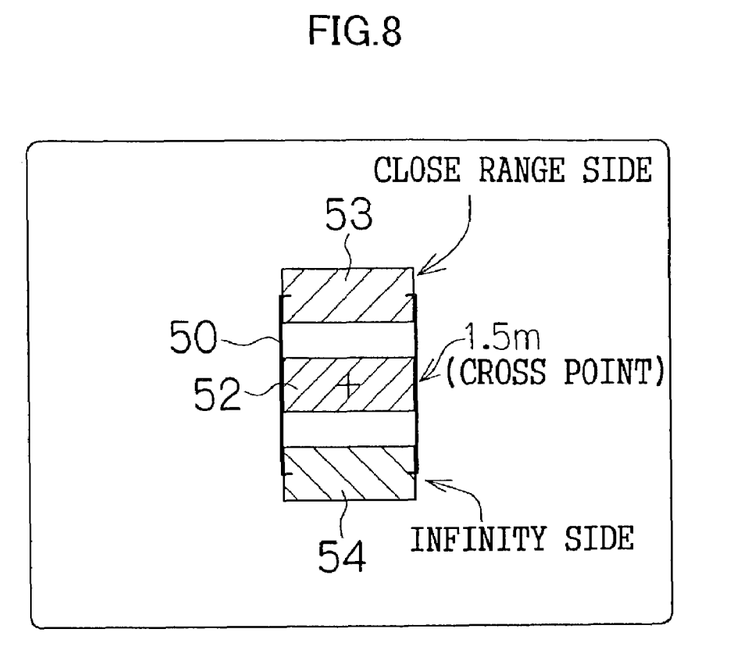
FIG. 8 illustrates target positions of the distance-measuring sensor according to the distance from the object.

The main reasons for making variable the area of the contrast AF are as follows. That is, as shown in FIG. 7, due to a parallax between the image pickup lens (lens section 12) and distance-measuring sensor 14, a target position of the distance-measuring sensor 14 with respect to the angle of view of the image captured may be shifted and may be shifted from an AF target mark 50 due to the distance from the object. Reference numeral 52 in FIG. 8 denotes the vicinity of a cross point, 53 denotes a close range, 54 denotes a target position (distance-measuring point) of the distance-measuring sensor 14 with respect to the object on the infinity side. According to FIG. 8, when the object exists closer to the close range than the cross point at a distance from the object of approximately 1.5 m, the target position of the distance-measuring sensor 14 is shifted upward from the center of the screen (reference numeral 53). On the contrary, when the object exists on a point on the infinity side, the target position of the distance-measuring sensor 14 is shifted downward from the center of the screen (reference numeral 54). Considering such a situation, the range for the contrast AF is widened depending on the distance from the object or the determination area subject to the contrast AF is changed depending on the distance.

Figure 9:
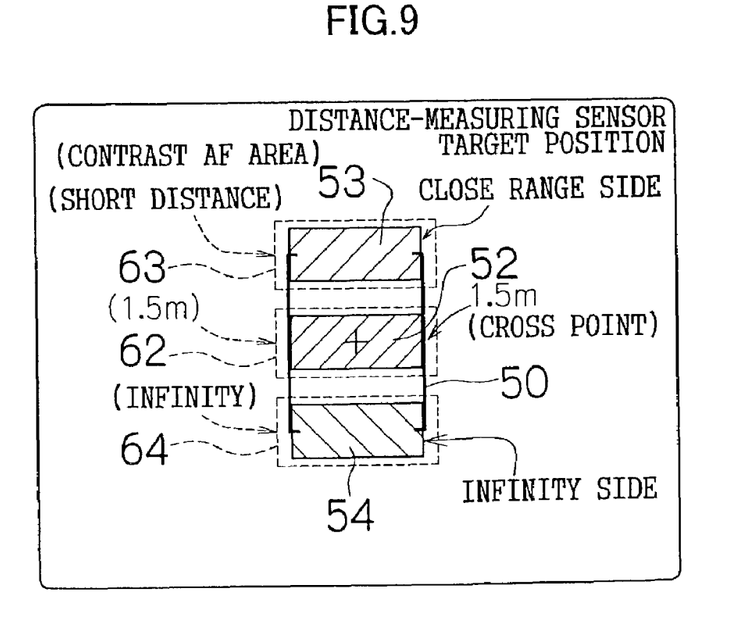
FIG. 9 illustrates a contrast AF area according to the target positions of the distance-measuring sensor.

FIG. 9 illustrates a change example of the contrast AF area. As shown in FIG. 9, the contrast AF area is made variable according to the target positions (52 to 54) of the distance-measuring sensor 14. When the object exists near the cross point, the center of the screen is set as the contrast AF area (reference numeral 62). When the object is in a short distance, the contrast AF area is set above the center of the screen in accordance with the target position 53 of the distance-measuring sensor 14 (reference numeral 63). When the object is at an infinite distance, the contrast AF area is set below the center of the screen in accordance with the target position 54 of the distance-measuring sensor 14 (reference numeral 64).

FIG. 9 illustrates three contrast AF areas <upper row/center/lower row>, but it is preferable to move the contrast AF area continuously or in stages in accordance with the parallax of the distance-measuring sensor 14 and the distance measurement result. Furthermore, when the parallax is large, the distance-measuring point may deviate from the center considerably and therefore it is also possible to increase the contrast AF area and cover the entire area corresponding to the deviation from the center.

Furthermore, instead of limiting the number of areas to be subjected to the contrast AF to one, it is possible to perform contrast AF in a plurality of parts predictable from the parallax and decide the focus position using the determination results.

Figure 10:
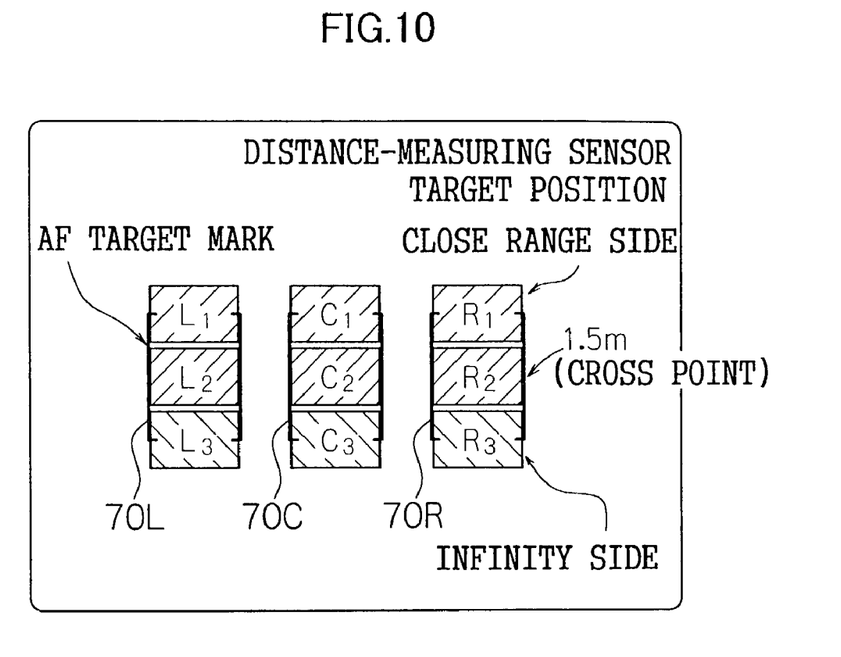
FIG. 10 illustrates an example of multi-point distance measurement.

FIG. 10 shows an example of multi-point distance measurement. According to FIG. 10, three target marks 70L, 70C and 70R are provided within a screen and the distance-measuring sensor 14 measures the distance from the object at these three points <left/center/right>. The method of measuring distances at a plurality of points using one distance-measuring sensor 14 is a publicly known technology. For example, in the case of an active sensor, distance-measurement can be realized by changing the direction of the infrared LED that transmits light. In the case of a passive sensor, distance-measurement can be realized by changing the reading locations of the line sensor in the horizontal direction.

In this case, the digital camera 10 selects the most reliable sensor output or the sensor output indicating the shortest distance from the three distance measured values and adjusts focus using that point as a target. For example, suppose the right (R) distance-measuring point is selected in FIG. 10. In that case, if the distance measured value is 1.5 m, the parallax is smallest and the object exists in the center of the target mark 70R, but if the distance measured value indicates an infinite distance, the object exists in the position below (R3) and if the distance measured value indicates a close range (e.g., 0.8 m), the object exists in the position above (R1). Therefore, it is possible to attain accurate focusing by changing the determination area of the contrast AF according to distance-measuring points and distance measured values of the distance-measuring sensor 14.

Figure 11:
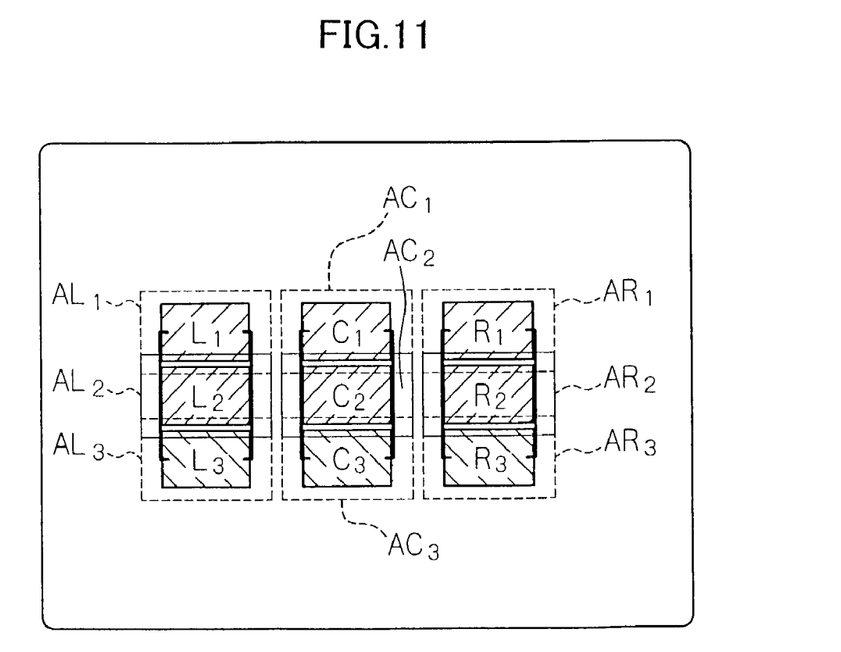
FIG. 11 illustrates contrast AF areas according to the target positions of the distance-measuring sensor carrying out multi-point distance measurement.

FIG. 11 illustrates contrast AF determination areas corresponding to a multi-point distance measuring area. This takes greater contrast AF areas $AL_i$, $AC_i$ and $AR_i$ (i=1, 2, 3) than the distance-measuring areas $L_i$, $C_i$ and $R_i$ (i=1, 2, 3) targeted by the distance-measuring sensor 14, but the magnitude relation of areas is not particularly limited and it is also possible to match the distance-measuring areas $L_i$, $C_i$ and $R_i$ (i=1, 2, 3) with the contrast AF areas $AL_i$, $AC_i$ and $AR_i$ (i=1, 2, 3).

According to the techniques explained in FIGS. 7 to 11, the area subject to the contrast AF is determined. When the contrast AF range (search range) and determination area are determined in step S122 and step S124 in FIG. 4, the focus lens 32 is moved to the search start position (initial position) according to the condition (step S126) and contrast AF processing is executed (step S128). That is, while the focus lens 32 is being moved from the search start position in a predetermined direction at predetermined pitch, contrast is determined at a plurality of AF determination points (search points) within the determination area and evaluation values are calculated. In this embodiment, the focus lens is moved from the infinity side to the near side, but the search direction is not limited when the present invention is implemented and it is also possible to move the focus lens from the near side to the infinity side.

As the method of calculating evaluation values, a conventionally known method is used. For example, the G component of the image signal acquired through the solid-state image pickup element 34 is sampled, a high frequency component within the AF determination target area is extracted, the absolute value thereof is taken and the value obtained by summing the absolute value data within the area (which corresponds to the evaluation value) is supplied to the control CPU 40. However, the method is not limited to the mode using the G component of the image signal, but it is also possible to use a brightness signal (Y signal).

The control CPU 40 totals the evaluation values calculated at the respective search points to decide the focus position (step S130). It is decided whether the focus position has been found or not using a publicly known technology according to the contrast AF result or on whether a peak with sufficient contrast has been found or not.

Figure 12:
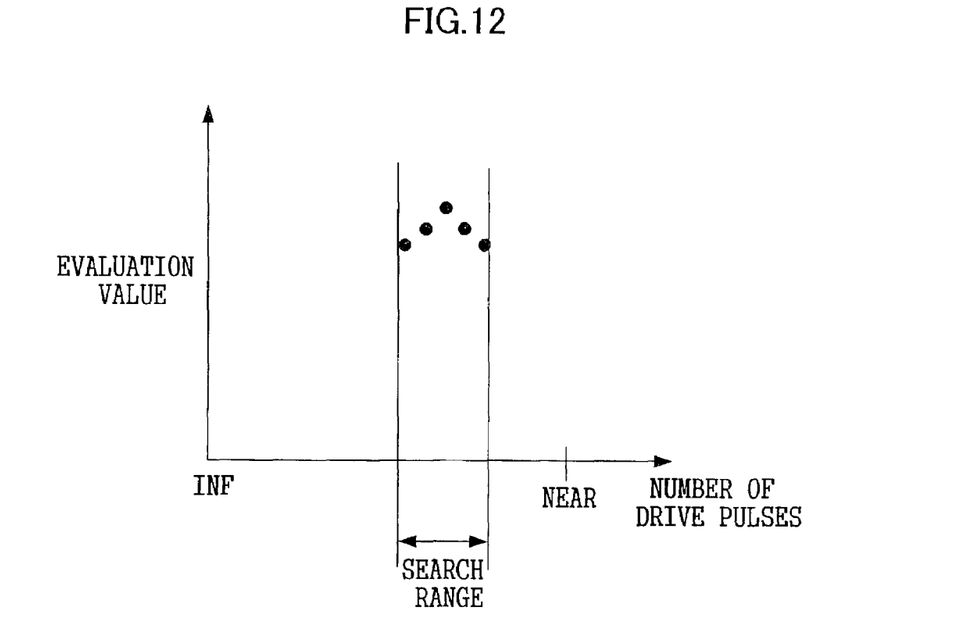
FIG. 12 is a graph showing how a peak of evaluation values is detected within a search range by a contrast AF.

As shown in FIG. 12, if a peak of evaluation values is detected within the search range, the lens position where the evaluation value reaches a maximum is determined as the focus position. The peak of evaluation values may be determined from discretely acquired evaluation values or by determining an evaluation value curve (evaluation value curve) through an interpolation calculation and detecting a peak of the evaluation value curve obtained.

In step S130 in FIG. 4, if a focus position is found, lens drive for moving the focus lens 32 to the focus position is performed (step S140) and then image pickup for recording is performed (step S150). Then, the image acquired by this image pickup operation (step S150) is recorded in the external recording device 48.

On the other hand, if no focus position is found in step S130, it is assumed that the distance-measuring error of the distance-measuring sensor 14 is large or a midpoint may have dropped out by a parallax. Therefore, in such a case, the search range is expanded (step S132) and the contrast AF is performed again (step S134). With regard to an expansion of the search range, there are a method of using the whole area from the close range to infinity as the search range and a method of limiting the search range.

Figure 13:
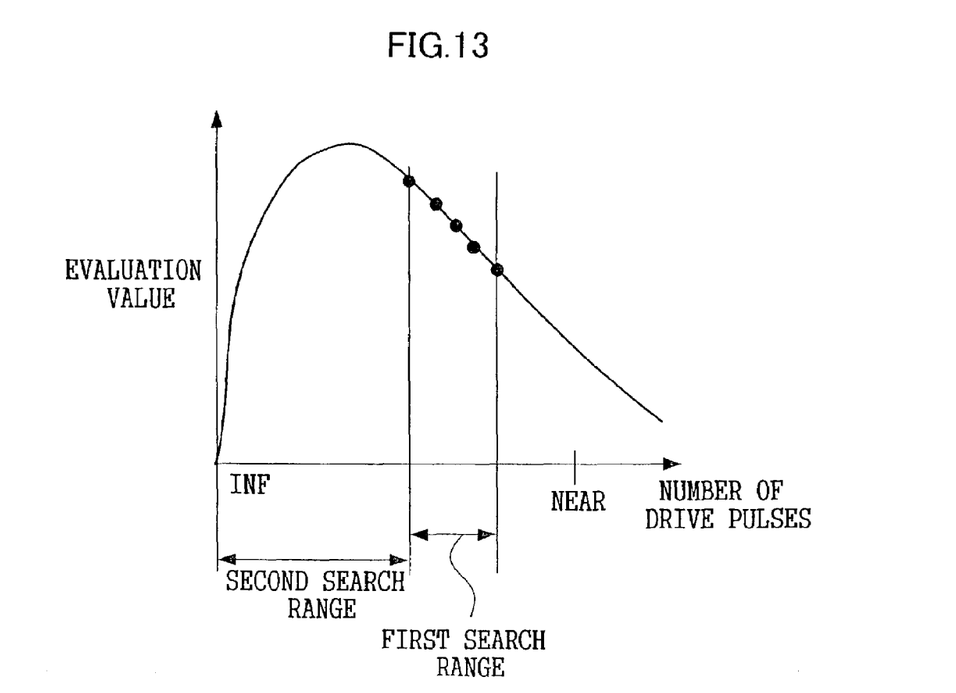
FIG. 13 is a graph showing, when a first contrast AF fails to detect a focus position, how the search range is changed and a second contrast AF is performed.

Even if no peak of evaluation values can be detected by a first contrast AF search, if the change of evaluation values is a monotonous decrease as shown in FIG. 13, it is assumed that the object exists on the infinity side, and a second search range is assumed to extend from the start position of the first search to infinity. However, there is no problem if the first search range overlaps with the second search range to some extent.

In this way, in step S134 in FIG. 4, the contrast AF is performed again and the focus position is determined (step S136). As a result, if the focus position is found, the focus lens is moved to the focus position (step S140) and image pickup is performed (step S150).

On the other hand, if no focus position is found in step S136, it is assumed that contrast is low, and therefore the focus lens is driven to a focus position which is assumed from the distance measurement result by the distance-measuring sensor (step S142) and at the same time an alarm is issued to indicate that the focusing has been impossible (step S144) and then image pickup is performed (step S150).

As the means for alarming, there can be a mode in which an alarm mark or message, etc. is displayed on the screen of the image display device, a mode in which an alarm lamp (not shown), etc. is lit (or kept flickering), a mode in which an alarm is notified by sound or a combination of these modes.

Then, another embodiment of the present invention will be explained.

Figure 14:
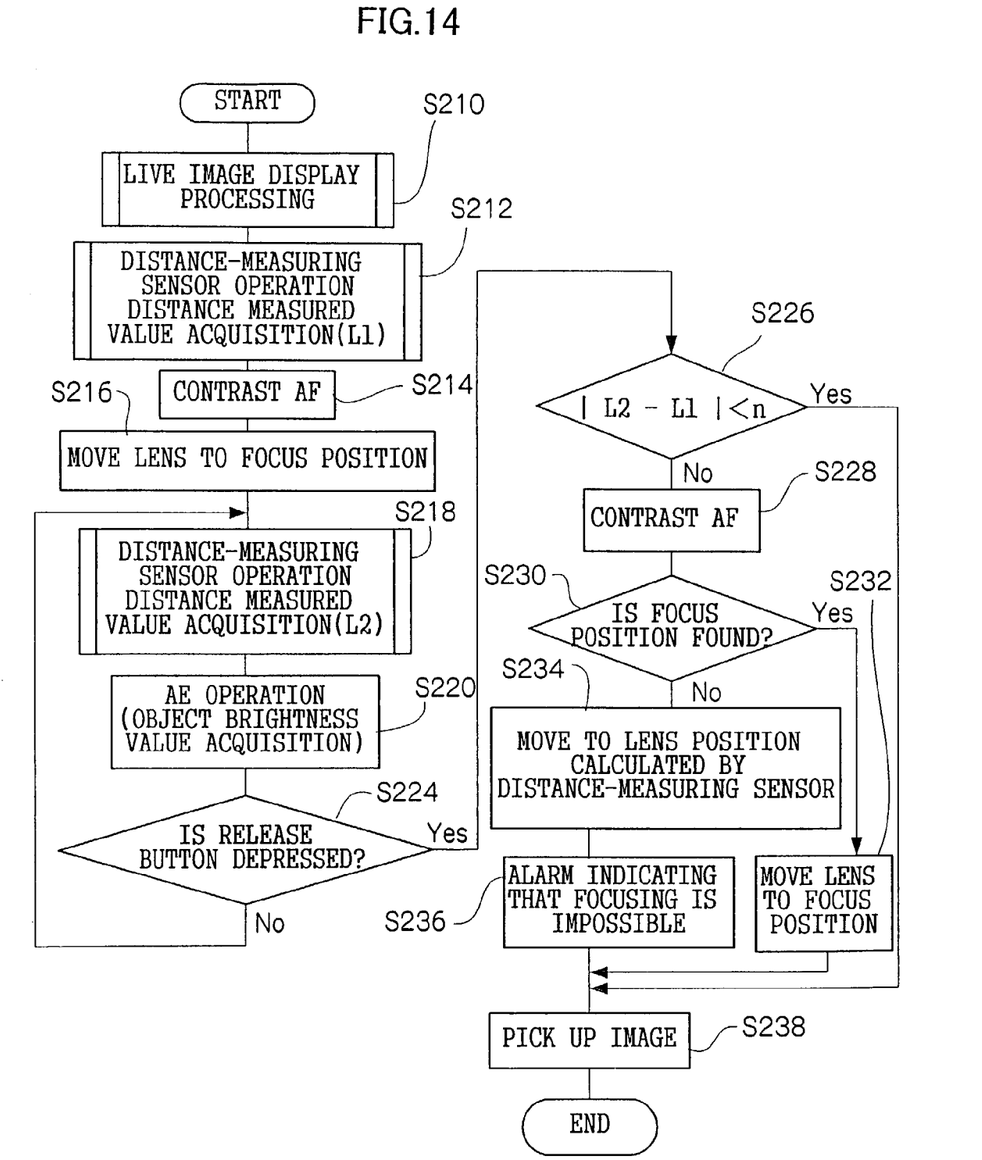
FIG. 14 is a flow chart showing an AF operation flow of a digital camera according to another embodiment of the present invention.

FIG. 14 is a flow chart showing an AF operation flow of a digital camera according to another embodiment of the present invention. FIG. 14 shows a control example of deciding whether or not to execute the contrast AF at the time S1 when the release button 16 is pressed. That is, when a live image display process (step S210) is started, a distance measurement process (step S212) by the distance-measuring sensor 14 and focus position determination according to the contrast system (step S214) are performed. The distance measured value at this time is recorded as L1 and the focus lens 32 is driven to the focus position according to the result of the focusing process by the contrast AF (step S216). Thereafter, the contrast AF process is no longer performed to reduce electric power consumption and a distance measurement process by the distance-measuring sensor 14 is performed periodically (step S218). The distance measured value at this time is recorded as L2. Furthermore, AE processing is carried out together with the acquisition of the distance measured value L2 (step S220) to acquire the brightness of the object.

The control CPU 40 monitors the operation of the release button 16 (step S224) and if the release button 16 has not been depressed, the process moves back to step S218 and repeats the distance measurement process and AE operation. When the user depresses the release button 16, the decision result in step S224 is "YES" and the process moves on to step S226.

In step S226, according to the distance measured values L1 and L2, it is decided whether the following Expression (9) is satisfied or not:

$$|L2-L1|<n, \qquad (9)$$

where n is a threshold.

If Expression (9) is satisfied, it is assumed that the object has not changed after the contrast AF is performed and the contrast AF process is omitted and image pickup is performed (step S238). On the other hand, if the Expression (9) is not satisfied in step S226, it is assumed that the object has changed and the contrast AF is performed again (step S228). When the focus position is determined (step S230) according to the result of the contrast AF in step S228, if the focus position is found, the focus lens 32 is driven to the focus position (step S232) and image pickup is performed (step S238).

Furthermore, if the focus position is not found in step S230, the focus lens is driven to the focus position which is assumed from the distance measurement result by the distance-measuring sensor 14 (step S234), an alarm is issued which indicates that focusing has been impossible (step S236), and then image pickup is performed (step S238).

Figure 15:
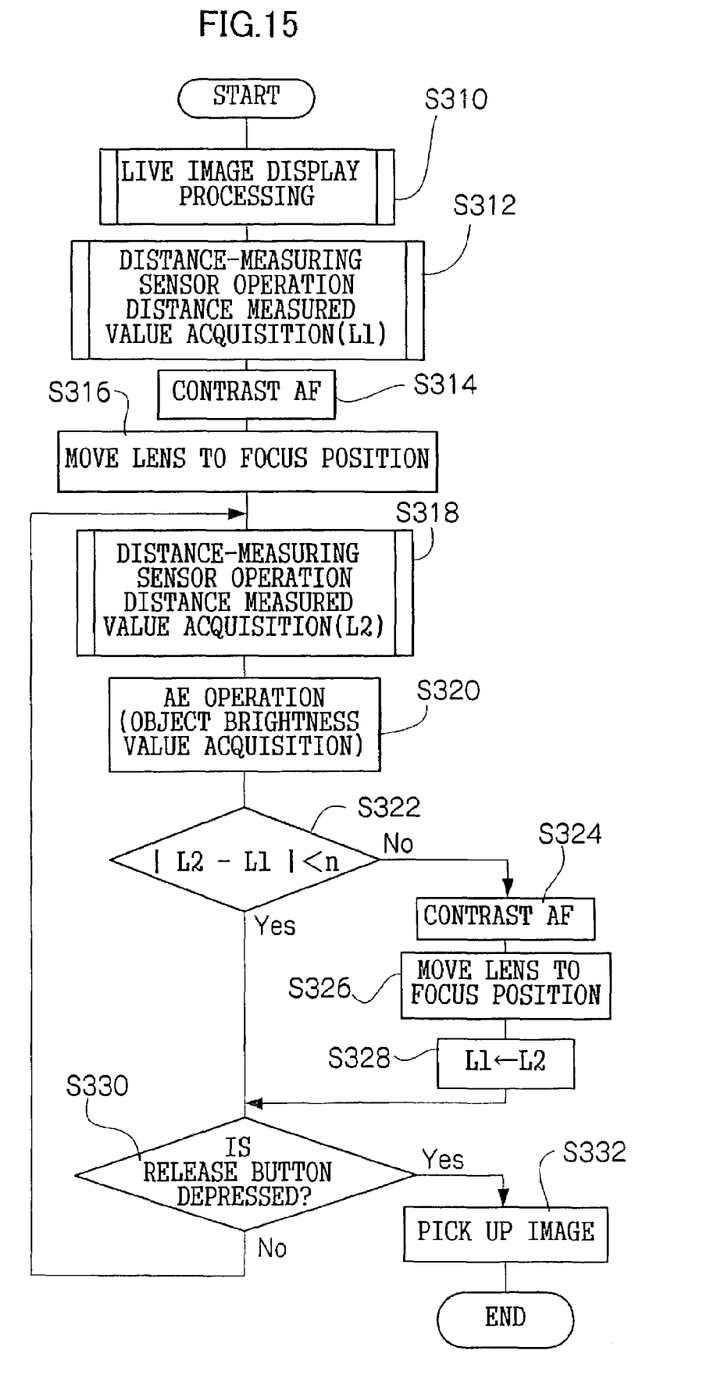
FIG. 15 is a flow chart showing an AF operation flow of a digital camera according to a still another embodiment of the present invention.

FIG. 15 is a flow chart showing a camera control procedure according to a still another embodiment of the present invention. FIG. 15 shows a control example of deciding whether or not to perform a contrast AF while a live image (movie output) is being displayed. That is, when a live image display process (step S310) is started, a distance measurement process by the distance-measuring sensor 14 (step S312) and focus position determination according to a contrast system are carried out (step S314). A distance measured value at this time is stored as L1 and the focus lens 32 is driven to the focus position according to the result of the focusing process by the contrast AF (step S316). Thereafter, the contrast AF process is no longer performed to reduce electric power consumption and a distance measurement process by the distance-measuring sensor 14 is performed periodically (step S318). The distance measured value at this time is recorded as L2. Furthermore, AE processing is carried out together with the acquisition of the distance measured value L2 (step S320) to acquire the brightness of the object.

While this live image is being displayed, it is periodically decided whether the results of L1 and L2 satisfy the following Expression (10) or not (step S322):

$$|L2-L1|<n, \qquad (10)$$

where n is a threshold.

If the decision result is "NO", that is, $|L2-L1|\geq n$, it is assumed in step S314 that the object has changed after the contrast AF is performed and the contrast AF is performed again (step S324) and the focus position is updated (step S326). At the same time, L2 is stored as a new L1 (step S328), and it is decided whether the release button 16 has been depressed or not (step S330).

If the release button 16 has not been depressed, the process moves back to step S318, distance measurement is continued periodically and it is decided whether Expression (10) is satisfied or not. If the decision result in step S322 shows that Expression (10) is satisfied, it is assumed that the object has not changed and the process moves on to step S330 by omitting the contrast AF process.

In the steps S318 through S330, a distance measurement process is performed periodically and if any change of the object is recognized, the contrast AF is performed to update the focus position, and therefore focusing is already achieved when the user depresses the release button 16. Therefore, if the decision result in step S330 is "YES", image pickup is performed without performing any contrast AF (step S332).

Although not shown in the flow chart, when the zoom lever 20 is operated and a focal length is changed, distance measurement by the distance-measuring sensor 14 and the contrast AF are also performed to maintain the focused state all the time.

As explained above, the present invention combines the distance-measuring device and contrast system AF to make variable the contrast AF search range according to conditions such as the distance measurement result, brightness of the object and focal length, and can thereby implement a high-speed, high accuracy autofocus adjustment device.

Moreover, the present invention adopts a configuration making variable the contrast AF determination area according to the distance from the object and focal length of the lens, and can thereby combine the distance-measuring points of the distance-measuring device and the contrast AF determination area and realize focus adjustment with high accuracy.

Further, the distance-measuring device is periodically operated to measure the distance from the object before an image pickup start command is inputted, and the focusing can be thereby sped up when the image pickup start command is inputted.

Furthermore, the distance-measuring device is periodically operated to measure the distance from the object so as to detect a change in the acquired distance measurement output and detect the change of the object. Then, the focus adjustment according to the contrast system is performed only when the change of the object is large. Thus, electric power consumption can be reduced and the focusing can be sped up, compared to the case where the contrast AF is performed all the time.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An autofocus adjustment device, comprising:
   a distance-measuring device which measures a distance from an object;
   an image pickup device which converts an optical image of the object taken in through an image pickup lens to an image signal;
   a focus adjustment device of a contrast system which adjusts a focus position of the image pickup lens using a high frequency component of the image signal outputted from the image pickup device;
   an automatic exposure operation device which activates automatic exposure operation; and
   a control device which acquires distance-measuring output by periodically activating the distance-measuring device ahead of input of an image pickup start command, activates the automatic exposure operation by the automatic exposure operation device, and controls focus adjustment in the contrast system using the acquired distance-measuring output and an image signal on which an automatic exposure operation has been performed upon reception of the image pickup start command, wherein the image pickup lens is driven according to a measurement result of the distance-measuring device, and then the focus adjustment of a contrast system is performed according to an image signal outputted from the image pickup device.

2. The autofocus adjustment device according to claim 1, wherein the automatic exposure operation of the automatic exposure operation device at least includes controlling of aperture diameter of a diaphragm and an electronic shutter of the solid-state image pickup element.

3. An autofocus adjustment device, comprising:
   a distance-measuring device which measures a distance from an object;
   an image pickup device which converts an optical image of the object taken in through an image pickup lens to an image signal;
   a focus adjustment device of a contrast system which adjusts a focus position of the image pickup lens using a high frequency component of the image signal outputted from the image pickup device;
   an object change detection device which acquires distance-measuring output by periodically activating the distance-measuring device and detects a change in the acquired distance-measuring output;
   an automatic exposure operation device which activates automatic exposure operation; and
   a control device which activates automatic exposure operation by the automatic exposure operation device, evaluates the change of the object according to the change of the detected distance-measuring output, and controls focus adjustment in the contrast system using the image signal on which the acquired distance-measuring output and the automatic exposure operation have been performed if the change of the object is determined large, wherein the image pickup lens is driven according to a measurement result of the distance-measuring device, and then the focus adjustment of a contrast system is performed according to an image signal outputted from the image pickup device.

4. The autofocus adjustment device according to claim 3, wherein the automatic exposure operation of the automatic exposure operation device at least includes controlling of aperture diameter of a diaphragm and an electronic shutter of the solid-state image pickup element.

* * * * *